US009651805B2

(12) United States Patent
Zhang et al.

(10) Patent No.: US 9,651,805 B2
(45) Date of Patent: May 16, 2017

(54) SUBSTRATE INCORPORATING A REPAIR STRUCTURE FOR RUBBING CLOTH

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Qian Zhang, Beijing (CN); Dongsheng Huang, Beijing (CN); Tingze Dong, Beijing (CN); Yujia Wang, Beijing (CN); Ying Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/498,262

(22) Filed: Sep. 26, 2014

(65) Prior Publication Data

US 2015/0253596 A1 Sep. 10, 2015

(30) Foreign Application Priority Data

Mar. 6, 2014 (CN) .......................... 2014 1 0080733

(51) Int. Cl.
*G02F 1/1337* (2006.01)
*G02F 1/13* (2006.01)
*G02F 1/1333* (2006.01)

(52) U.S. Cl.
CPC ...... *G02F 1/1309* (2013.01); *G02F 1/133784* (2013.01); *G02F 1/133351* (2013.01)

(58) Field of Classification Search
CPC .. G02F 1/1303; G02F 1/1309; G02F 1/13378; G02F 1/133784
See application file for complete search history.

(56) References Cited

U.S. PATENT DOCUMENTS

2003/0117574 A1* 6/2003 Park .................. G02F 1/133784 349/187
2004/0156003 A1* 8/2004 Takachi ............ G02F 1/133784 349/123

(Continued)

FOREIGN PATENT DOCUMENTS

CN 1519628 A 8/2004
CN 1790142 A 6/2006

(Continued)

OTHER PUBLICATIONS

First Office Action dated Dec. 4, 2015 corresponding to Chinese application No. 201410080733.0.

(Continued)

*Primary Examiner* — Mariceli Santiago
(74) *Attorney, Agent, or Firm* — Nath, Goldberg & Meyer; Joshua B. Goldberg; Scott H. Blackman

(57) ABSTRACT

The present invention provides a substrate, wherein a repair structure is arranged on the substrate and used for repairing surface fibers of rubbing cloth. According to the substrate provided by the present invention, by virtue of the repair structure on the substrate, the curvatures of the surface fibers of the rubbing cloth can be the same when the rubbing cloth passes through the repair structure, thus improving the arrangement orderliness of the surface fibers of the rubbing cloth, and then effectively alleviating the phenomenon of poor rubbing.

12 Claims, 3 Drawing Sheets

(56) References Cited

U.S. PATENT DOCUMENTS

2006/0132701 A1* 6/2006 Minowa ................ G02F 1/1333
349/187
2008/0170191 A1* 7/2008 Wu .................. G02F 1/133784
349/126

FOREIGN PATENT DOCUMENTS

JP 04333824 A * 11/1992
JP H04333824 A 11/1992
JP 2003195251 A * 7/2003
JP 2007-79211 A 3/2007
JP 2008-111994 A 5/2008

OTHER PUBLICATIONS

2nd Office Action issued in corresponding Chinese application No. 201410080733.0 dated Apr. 13, 2016.
Office Action dated Sep. 26, 2016 issued in corresponding Chinese Application No. 201410080733.0.

* cited by examiner

SUBSTRATE INCORPORATING A REPAIR STRUCTURE FOR RUBBING CLOTH

FIELD OF THE INVENTION

The present invention relates to the field of display technology, and particularly relates to a substrate.

BACKGROUND OF THE INVENTION

In a liquid crystal display (LCD), the rotation direction and angle of liquid crystal molecules are controlled so as to control the amount of light transmitting through a liquid crystal layer, thus displaying images with various grey levels. Therefore, an alignment layer with uniform orientation is indispensable to the liquid crystal display in guaranteeing the uniform arrangement of the liquid crystal molecules.

Among various methods for manufacturing the alignment layer of a liquid crystal display, a rubbing method is the most common one. The process of manufacturing an alignment layer of a liquid crystal display by the rubbing method is as follows: an array substrate coated with the alignment layer is placed on a machine table, a roller wound with rubbing cloth contacts a substrate and rotates at a high speed, meanwhile the machine table moves towards a certain direction, thus performing a rubbing treatment on the whole substrate. Uniform microgrooves are formed on the alignment layer on the substrate after such rubbing treatment, thus the alignment layer possesses a capacity of orientating liquid crystal molecules.

However, for an advanced super dimension switch (ADSDS) liquid crystal display product, a peripheral pad region is formed on an array substrate thereof, and various types of lead wire connection parts are formed on the peripheral pad region. During a process of carrying out rubbing treatment on the array substrate, lead wires in the peripheral pad region contact the rubbing cloth, which impacts the shapes of fibres on rubbing surface of the rubbing cloth to a certain extent, so that an alignment layer obtained after going through subsequent rubbing treatment is incapable of ensuring the uniform arrangement of liquid crystal molecules, the phenomenon of poor rubbing occurs, and the liquid crystal display effect is further influenced.

SUMMARY OF THE INVENTION

Technical Problems to be Solved

Aiming at the problems above, the present invention provides a substrate capable of effectively alleviating the phenomenon of poor rubbing generated when the substrate is rubbed with rubbing cloth.

Technical Solution

In order to solve the technical problems above, the technical solution of the present invention provides a substrate, comprising a repair structure arranged thereon and used for repairing surface fibres of the rubbing cloth.

Further, the substrate comprises a plurality of display units, and the repair structure is arranged along an edge, vertical to a rubbing direction, of the substrate, and/or located between two adjacent display units in the rubbing direction.

Further, a corresponding region of the repair structure on the substrate is in the shape of a rectangle.

Further, the repair structure comprises a plurality of strip-shaped bulges which are arranged in parallel.

Further, the cross sections of the strip-shaped bulges are any one of a trapezoid, a rectangle or a triangle.

Further, the strip-shaped bulges are arranged at an identical interval.

Further, extending direction of the strip-shaped bulges is the same as the rubbing direction.

Further, each of the display units comprises a first side and a second side vertical to the first side, the corresponding region comprises a third side parallel and opposite to the first side and a fourth side parallel and opposite to the second side, the rubbing direction is a direction parallel to the first side, and a length of the fourth side is greater than or equal to that of the second side.

Further, the rubbing cloth is driven by a roller to rub the display units, the substrate, led by a machine table on which the substrate is placed, moves in a direction parallel to the first side, and a length k of the third side satisfies the formula $k \geq a/n$, wherein n is rotational speed of the roller, and a is moving speed of the machine table in the direction parallel to the first side.

Further, the repair structure comprises:

a pattern comprising gates, an insulation layer, a pattern comprising a semiconductor active layer, a pattern comprising data lines and a passivation layer which are sequentially formed in a region corresponding to the edge of the substrate vertical to the rubbing direction, and/or in a region between two adjacent display units in the rubbing direction, wherein the pattern comprising the data lines is formed into a plurality of strip-shaped bulges which are arranged in parallel.

Further, the repair structure comprises:

a pattern comprising gates, an insulation layer, a passivation layer and a pattern comprising pixel electrodes which are sequentially formed in a region corresponding to the edge of the substrate vertical to the rubbing direction, and/or in a region between two adjacent display units in the rubbing direction, wherein both the pattern comprising the gates and the pattern comprising the pixel electrodes are formed to be a plurality of strip-shaped bulges which are arranged in parallel in the region.

Further, the substrate comprises a plurality of the repair structures.

Beneficial Effects

By arranging the repair structure(s) on the substrate, the curvatures of the surface fibres of the rubbing cloth become identical when the rubbing cloth passes through the repair structure(s), so that the surface fibres of the rubbing cloth are arranged in a better-ordered fashion, and then the phenomenon of poor rubbing is effectively alleviated.

DETAILED DESCRIPTION OF THE EMBODIMENTS

The specific implementations of the present invention are further described in detail below in conjunction with the accompanying drawings and the embodiments. The implementations below are used for illustrating the present invention, rather than limiting the scope of the present invention.

The present invention provides a substrate, on which a repair structure used for repairing surface fibres of rubbing cloth is arranged.

The repair structure is arranged on the substrate provided by the present invention. Therefore, the curvatures of the surface fibres of the rubbing cloth are made identical to each other when the rubbing cloth passes through the repair structure, so that the surface fibres of the rubbing cloth are arranged in a better-ordered fashion, and then the phenomenon of poor rubbing is effectively alleviated.

Figure 1:
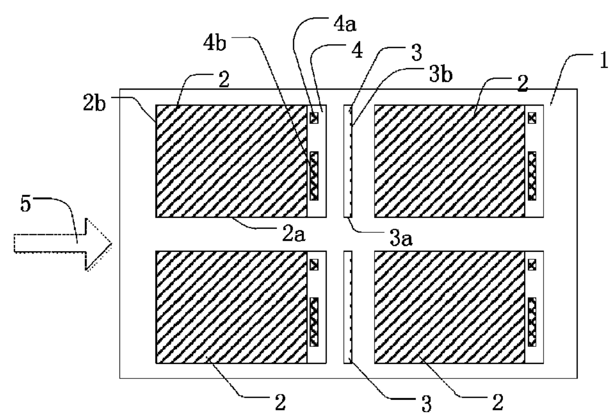
FIG. 1 is a schematic diagram of a first example structure of a substrate provided by an embodiment of the present invention.

In this case, the substrate may comprise a plurality of display units, and the repair structure can be arranged along an edge, vertical to a rubbing direction, of the substrate, and/or located between two adjacent display units in the rubbing direction. The rubbing direction refers to the direction in which the rubbing cloth rubs the substrate. FIG. 1 is a schematic diagram of a first example structure of the substrate provided by the embodiment of the present invention, and shows the case that the repair structure is located between two adjacent display units in the rubbing direction. Referring to FIG. 1, the substrate 1 comprises two repair structures 3 and four display units 2 formed on the substrate in an array. That is, as shown in FIG. 1, the rubbing direction is the direction shown by an arrowhead 5 (the row direction of the display units in the figure), the two repair structures 3 are located between the two display units in the first row, and between the two display units in the second row, respectively. Of course, the repair structures can also be arranged along the edge, vertical to the rubbing direction, of the substrate. For example, the repair structures can be located on the left side of the two display units in the first column shown in FIG. 1 (i.e. arranged along the left edge of the substrate), and in this way, the rubbing cloth can be pre-repaired before rubbing the display units, thus better ensuring the rubbing quality.

It needs to be noted that, in the embodiment of the present invention, the plurality of display units on the substrate can be cut apart by a cutting process, and an individually separated display unit may form a display panel by an aligning process. For example, the display units can be array substrates, and the array substrates and colour film substrates can form display panels capable of displaying images by the aligning process. Although the case that one substrate is provided with four display units is illustrated as an example in the embodiment of the present invention, such quantity of the display units on the substrate is merely an example. In some practical applications, the substrate may comprise six, eight, nine and even more display units, which are not limited in the present invention.

During the process of rubbing the substrate 1 by the rubbing cloth along the direction 5, the surface fibres of the rubbing cloth contact the surfaces of the display units 2. Because pad regions 4 are formed on the display units 2, and each of the pad regions 4 includes an electric test pad region (ET Pad) 4*a* and a chip bonding pad region (IC Bonding Pad) 4*b*, when the surface of the rubbing cloth contacts the Pad regions 4, the curvatures of the surface fibres of the rubbing cloth are influenced to a certain extent, and thus the curvatures of the surface fibres of the rubbing cloth become different. When the rubbing cloth contacts the repair structures 3 after passing through the pad regions 4, the repair structures 3 enable the curvatures of the surface fibres of the rubbing cloth to be the same again, that is, the surface fibres of the rubbing cloth become orderly arranged again. As a result, during the subsequent process of rubbing the substrate by the rubbing cloth, microgrooves can be orderly formed in the surface of the substrate, and thus the phenomenon of poor rubbing can be alleviated.

Preferably, the corresponding region of each repair structure 3 on the substrate may be in the shape of a rectangle. The rectangle may be a strip with long sides far longer than short sides and vertical to the rubbing direction.

Referring to FIG. 1 again, each of the display units 2 comprises a first side 2*a* and a second side 2*b* vertical to the first side 2*a*, the corresponding region of each of the repair structures 3 on the substrate comprises a third side 3*a* parallel and opposite to the first side 2*a*, and a fourth side 3*b* parallel and opposite to the second side 2*b*. The rubbing cloth rubs the display units 2 along a direction 5, namely the rubbing direction, parallel to the first side 2*a*. The length of the fourth side 3*b* of the corresponding region of the repair structure 3 on the substrate may be set according to specific conditions. Preferably, the length of the fourth side 3*b* of the corresponding region of each of the repair structures 3 on the substrate may be greater than or equal to the length of the second side 2*b* of the display unit 2 corresponding to the repair structure 3, so that all the fibres with the curvatures influenced by the Pad regions 4 on the surface of the rubbing cloth can contact the repair structures, and in this way, the effective region of the rubbing cloth, or the entire rubbing cloth having contacted the display units, can be repaired.

Figure 2:
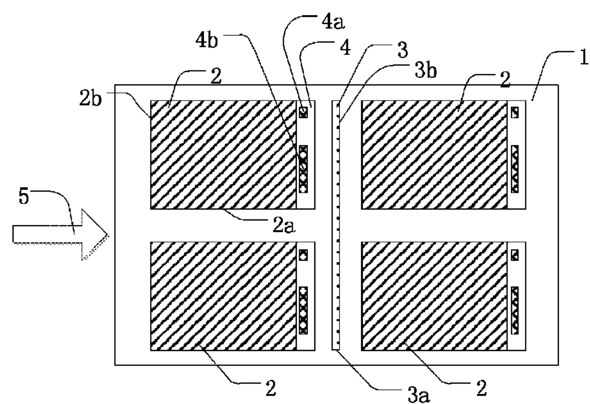
FIG. 2 is a schematic diagram of a second example structure of the substrate provided by the embodiment of the present invention.

FIG. 2 is a schematic diagram of a second example structure of the substrate provided by the embodiment of the present invention. Referring to FIG. 2, the substrate 1 comprises a repair structure 3 and four display units 2 formed on the substrate in an array, wherein the length of a fourth side 3*b* of the corresponding region of the repair structure 3 on the substrate is greater than or equal to the double of the length of a second side 2*b* of the display unit 2, and thus the repair structure 3 can be located both between the two display units in the first row and between the two display units in the second row. The structure of the substrate shown in FIG. 2 may be seen as a structure obtained by extending the upper and lower repair structures 3 on the substrate shown in FIG. 1 downwards and upwards respectively so as to be connected with each other. Although the case that one substrate is provided with four display units is illustrated as an example in the embodiment of the present invention, such quantity of the display units on the substrate in the case is merely an example. In some practical applications, one substrate can comprise six, eight, nine or more display units, which are not limited in the present invention. In these cases, one repair structure 3 may be arranged between any two adjacent columns of display units, and the length of the fourth side 3*b* of the corresponding region of each of the repair structures 3 on the substrate is greater than or equal to the sum of the lengths of the second sides 2*b* of all the display units in each column and distances between the display units in any two adjacent rows.

In the embodiment of the present invention, the rubbing cloth can be driven by a roller to rub the display units, and the substrate placed on the machine table moves in a direction parallel to the first sides 2*a* of the display units following the movement of the machine table. Specifically, the rubbing cloth wraps around the peripheral surface of the roller, the roller rotates above the machine table, and the central axis which the roller rotates around is vertical to the first sides 2*a* of the display units. In order to ensure that all the fibres of the rubbing cloth having contacted the Pad regions can be repaired while the rubbing cloth passes through the repair structure, the length k of the third side 3*a* of the corresponding region of the repair structure 3 on the substrate satisfies the formula $k \geq a/n$.

Here, n is the rotational speed of the roller, and a is the moving speed of the machine table in a direction parallel to the first side. For example, the rotational speed of the roller is 10 r/s, the moving speed of the machine table is 60 mm/s, and then the minimum value of the length k of the third side 3*a* of the corresponding region of the repair structure 3 on the substrate is 6 mm.

Figure 3:
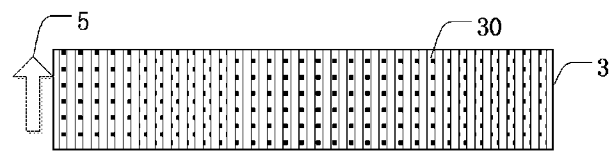
FIG. 3 is a planar graph of an exemplary repair structure provided by the embodiment of the present invention.

FIG. 3 is a planar graph of an exemplary repair structure provided by the embodiment of the present invention. Referring to FIG. 3, the repair structure 3 can comprise a plurality of strip-shaped bulges 30 which are arranged in parallel, preferably, a plurality of strip-shaped bulges with the same shape, wherein the extending direction of the strip-shaped bulges 30 is the same as the rubbing direction (i.e. the direction 5 of rubbing the substrate by the rubbing cloth).

Preferably, the plurality of strip-shaped bulges 30 are arranged at an identical interval.

Figure 4:
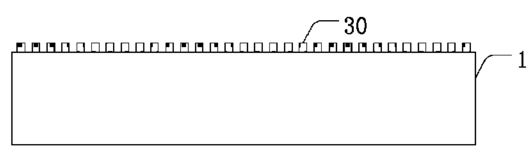
FIG. 4 is a sectional view of the exemplary repair structure shown in FIG. 3.

FIG. 4 is a sectional view of the exemplary repair structure shown in FIG. 3. In FIG. 4, the cross sections of the strip-shaped bulges 30 are shown in the shape of a rectangle respectively. However, the cross sections of the strip-shaped bulges 30 can be in any proper shape, for example, a trapezoid or a triangle.

Figure 5:
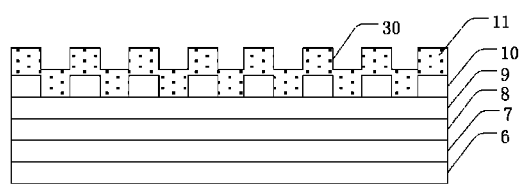
FIG. 5 is a schematic diagram showing the formation of the repair structure provided by the embodiment of the present invention by virtue of channel regions in the display units.

In the embodiment of the present invention, the repair structure 3 may be prepared, along with the process of preparing the substrate, by processes such as deposition, etching and so on. FIG. 5 is a schematic diagram showing the formation of the repair structure provided by the embodiment of the present invention by virtue of channel regions in the display units. Referring to FIG. 5, the pattern of the repair structure can be a film layer structure the same as the channel regions in the display units, and therefore, the formation process for the repair structure is the same as that for the channel regions. Specifically, a pattern 7 comprising gate(s), an insulation layer 8 and a pattern 9 comprising a semiconductor active layer are sequentially formed in the corresponding regions of a substrate 6, then a pattern 10 comprising data lines is formed on the pattern 9 comprising the semiconductor active layer, wherein the region along the edge of the substrate vertical to the rubbing direction and/or the region between two adjacent display units in the rubbing direction of the pattern 10 comprising the data lines is formed to be a plurality of strip-shaped bulges which are arranged in parallel. Then, a passivation (PVX) layer 11 with uniform thickness is formed on the pattern 10 comprising the data lines, thus forming the pattern of the above repair structure 3.

Figure 6:
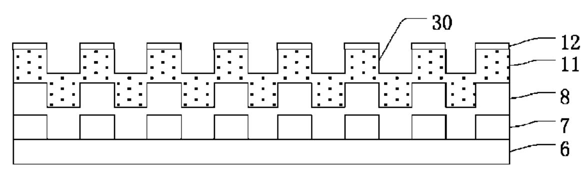
FIG. 6 is a schematic diagram showing the formation of the repair structure provided by the embodiment of the present invention by virtue of film layer structures of the peripheral lead regions for binding ICs (integrated circuits) in the display units.

In addition, the pattern of the repair structure may also be a film layer structure of the peripheral lead region for binding ICs in the display unit. FIG. 6 is a schematic diagram showing a case in which the repair structure provided by the embodiment of the present invention is formed by virtue of the film layer structure of the peripheral lead region for binding the ICs in the display unit. Referring to FIG. 6, a pattern 7 comprising gate(s) is firstly formed on a substrate 6, wherein the region, located between two adjacent display units in the rubbing direction, of the pattern 7 comprising the gates is formed to be a plurality of strip-shaped bulges which are arranged in parallel. Then, an insulation layer 8 with uniform thickness and a passivation (PVX) layer 11 with uniform thickness are sequentially formed on the pattern 7 comprising the gates, and a pattern 12 comprising pixel electrodes is formed on the passivation layer 11. The shape of the pattern 12 comprising the pixel electrodes in the region between two adjacent display units in the rubbing direction is the same as that of the pattern 7 comprising the gates in the region, that is, a shape corresponding to the strip-shaped bulges which are arranged in parallel in the pattern 7 comprising the gates is formed, thus forming the pattern of the above repair structure 3. In addition, the strip-shaped bulges which are arranged in parallel in the repair structure may also be formed by other film layers such as semiconductor active layers or passivation layers, which are not described redundantly herein.

In the substrate shown in FIG. 1, each repair structure is arranged between two adjacent display units in the same row, and two repair structures are provided. The repair structure of the substrate shown in FIG. 2 is a longer repair structure formed by connecting the upper and lower repair structures which are opposite to each other in the substrate shown in FIG. 1. However, according to the present invention, the arrangement and quantity of the repair structures on the substrate are not limited thereto.

Figure 7:
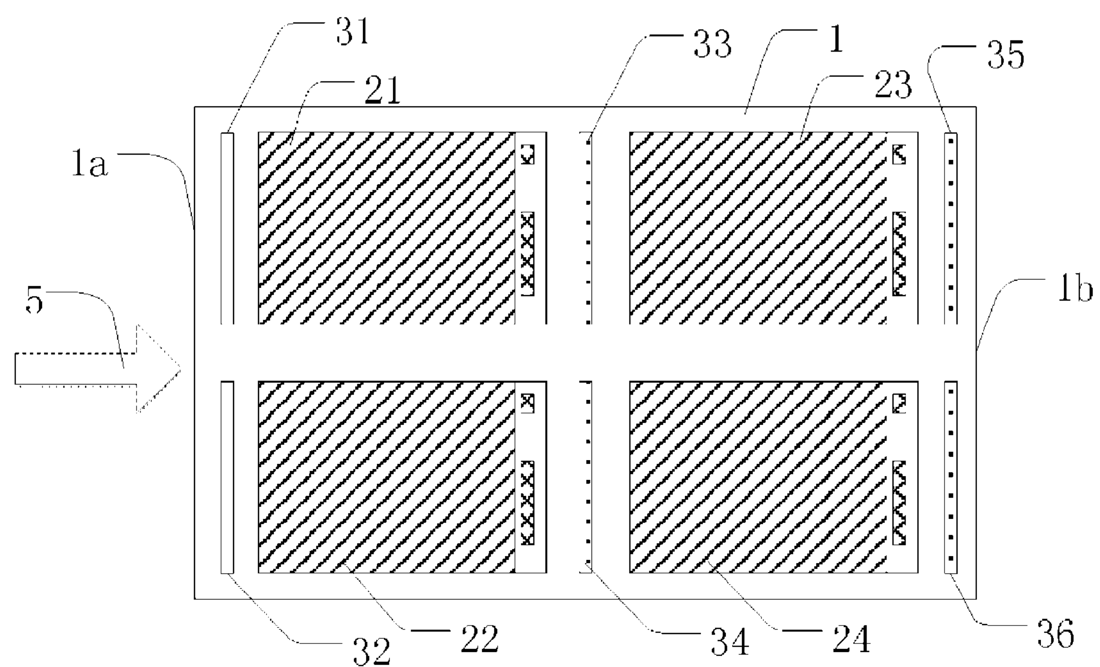
FIG. 7 is a schematic diagram of a third example structure of the substrate provided by the embodiment of the present invention.

FIG. 7 is a schematic diagram of a third example structure of the substrate provided by the embodiment of the present invention. Referring to FIG. 7, the rubbing cloth rubs the substrate 1 along the direction 5. The substrate 1 comprises four display units, namely a display unit 21, a display unit 22, a display unit 23 and a display unit 24. Three groups of repair structures are arranged on the substrate 1, and each group includes two repair structures. Specifically, the first group includes a repair structure 31 and a repair structure 32 which are located at the edge 1*a* of the left side of the substrate 1, and used for re-repairing the rubbing cloth before the rubbing cloth rubs the substrate 1. That is, the repair structures 31 and 32 are arranged along an edge, vertical to the rubbing direction, of the substrate. More specifically, the repair structure 31 is located between the left edge 1*a* of the substrate and the left edge of the display unit 21, and the repair structure 32 is located between the left edge 1*a* of the substrate and the left edge of the display unit 22. The second group includes a repair structure 33 and a repair structure 34 which are located in the middle of the substrate 1, and used for repairing the surface fibres of the rubbing cloth having been in contact with the pad regions 4 (see FIG. 1 or FIG. 2) of the display unit 21 and the display unit 22. That is, the repair structures 33 and 34 each are located between two adjacent display units in the rubbing direction. More specifically, the repair structure 33 is located between the display unit 21 and the display unit 23, and the repair structure 34 is located between the display unit 22 and the display unit 24. The third group includes a repair structure 35 and a repair structure 36 which are located at the edge 1*b* of the right side of the substrate, and used for repairing the rubbing cloth after the rubbing cloth finishes rubbing the substrate. That is, the repair structures 35 and 36 are arranged along an edge, vertical to the rubbing direction, of the substrate. More specifically, the repair structure 35 is located between the right edge 1*b* of the substrate and the right edge of the display unit 23, and the repair structure 36 is located between the right edge 1*b* of the substrate and the right edge of the display unit 24.

It should be understood that various additions, deletions, modifications or variations can be made within the scope of the present invention. For example, as for the structure of the substrate shown in FIG. 7, any one of the three groups of repair structures may be removed. Alternatively, for example, the repair structures 31 and 32 can be connected to form a single longer repair structure. In addition, the repair structures can also be arranged in the display units, and specifically, in regions other than the effective display regions in the display units.

According to the substrate provided by the embodiment of the present invention, the repair structure is arranged on the substrate. The curvatures of the surface fibres of the rubbing cloth become identical when the rubbing cloth passes through the repair structure, so that the surface fibres of the rubbing cloth are arranged in a better-ordered fashion, the phenomenon of poor rubbing is effectively alleviated and the contrast of a display panel is improved.

The implementations above are merely used for illustrating the present invention, rather than limiting the present invention. Those of ordinary skill in the related art can also make various changes and variations without departing from the scope of the present invention. Therefore, all equivalent technical solutions are also within the scope of the present invention, and the patent protection scope of the present invention should be defined by claims.

The invention claimed is:

1. A substrate, comprising a repair structure arranged thereon and used for repairing surface fibres of rubbing cloth, wherein the repair structure comprises a plurality of strip shaped bulges which are arranged in parallel, each strip shaped bulge having an extending direction and a rubbing direction that is a direction in which the rubbing cloth rubs the substrate, wherein the extending direction of the strip shaped bulges is the same as the rubbing direction, and wherein the substrate comprises a plurality of display units, wherein the repair structure further comprises: a pattern comprising gates, an insulation layer, a pattern comprising a semiconductor active layer, a pattern comprising data lines and a passivation layer which are sequentially formed in a region corresponding to an edge of the substrate vertical to the rubbing direction, and/or in a region between two adjacent display units in the rubbing direction, wherein the pattern comprising the data lines is formed into a plurality of strip-shaped bulges which are arranged in parallel.

2. The substrate according to claim 1, wherein the shapes of the cross sections of the strip-shaped bulges are any one of a trapezoid, a rectangle or a triangle.

3. The substrate according to claim 1, wherein the plurality of strip-shaped bulges are arranged at an identical interval.

4. The substrate according to claim 1, wherein the substrate comprises a plurality of the repair structures.

5. The substrate according to claim 1, wherein a corresponding region of the repair structure on the substrate is in the shape of a rectangle.

6. The substrate according to claim 5, wherein each of the display units comprises a first side and a second side vertical to the first side, the corresponding region comprises a third side parallel and opposite to the first side and a fourth side parallel and opposite to the second side, the rubbing direction is a direction parallel to the first side, and a length of the fourth side is greater than or equal to that of the second side.

7. The substrate according to claim 6, wherein the substrate comprises a plurality of the repair structures.

8. The substrate according to claim 5, wherein the substrate comprises a plurality of the repair structures.

9. A substrate, comprising a repair structure arranged thereon and used for repairing surface fibres of rubbing cloth, wherein the repair structure comprises a plurality of strip shaped bulges which are arranged in parallel, each strip shaped bulge having an extending direction and a rubbing direction that is a direction in which the rubbing cloth rubs the substrate, the extending direction of the strip shaped bulges is the same as the rubbing direction, and a corresponding region of the repair structure on the substrate is in the shape of a rectangle, wherein the substrate comprises a plurality of display units, each of the display units comprises a first side and a second side vertical to the first side, the corresponding region comprises a third side parallel and opposite to the first side and a fourth side parallel and opposite to the second side, the rubbing direction is a direction parallel to the first side, and a length of the fourth side is greater than or equal to that of the second side, wherein the rubbing cloth is driven by a roller to rub the display units, the substrate, led by a machine table on which the substrate is placed, moves in a direction parallel to the first side, and a length k of the third side satisfies the formula $k \geq a/n$;

wherein, n is rotational speed of the roller, and a is moving speed of the machine table in the direction parallel to the first side.

10. The substrate according to claim 9, wherein the substrate comprises a plurality of the repair structures.

11. A substrate, comprising a repair structure arranged thereon and used for repairing surface fibres of rubbing cloth, wherein the repair structure comprises a plurality of strip shaped bulges which are arranged in parallel, each strip shaped bulge having an extending direction and a rubbing direction that is a direction in which the rubbing cloth rubs the substrate, wherein the extending direction of the strip shaped bulges is the same as the rubbing direction, and wherein the substrate comprises a plurality of display units, wherein the repair structure comprises:

a pattern comprising gates, an insulation layer, a passivation layer and a pattern comprising pixel electrodes which are sequentially formed in a region corresponding to the edge of the substrate vertical to the rubbing direction, and/or in a region between two adjacent display units in the rubbing direction, wherein both the pattern comprising the gates and the pattern comprising the pixel electrodes are formed to be a plurality of strip-shaped bulges which are arranged in parallel in the region.

12. The substrate according to claim 11, wherein the substrate comprises a plurality of the repair structures.

* * * * *